(12) United States Patent
Parrott et al.

(10) Patent No.: US 10,532,609 B2
(45) Date of Patent: Jan. 14, 2020

(54) METHOD FOR TRAVERSING SURFACE WITH MAGNETIC OMNI-WHEEL

(71) Applicant: Saudi Arabian Oil Company, Dhahran (SA)

(72) Inventors: Brian Parrott, Dhahran (SA); Pablo Carrasco Zanini, Thuwal (SA); Ali Outa, Thuwal (SA); Fadl Abdellatif, Thuwal (SA); Hassane Trigui, Thuwal (SA)

(73) Assignee: Saudi Arabian Oil Company, Dhahran (SA)

(*) Notice: Subject to any disclaimer, the term of this patent is extended or adjusted under 35 U.S.C. 154(b) by 114 days.

(21) Appl. No.: 15/642,050

(22) Filed: Jul. 5, 2017

(65) Prior Publication Data

US 2017/0297366 A1    Oct. 19, 2017

Related U.S. Application Data

(60) Division of application No. 15/436,368, filed on Feb. 17, 2017, now Pat. No. 9,849,722, which is a
(Continued)

(51) Int. Cl.
*B60B 19/00* (2006.01)
*B60B 19/12* (2006.01)

(52) U.S. Cl.
CPC .......... *B60B 19/006* (2013.01); *B60B 19/003* (2013.01); *B60B 19/12* (2013.01); *B60B 2900/351* (2013.01); *B60B 2900/931* (2013.01)

(58) Field of Classification Search
CPC .............. B60B 19/003; B60B 19/006; B60B 2900/931; B60Y 2200/40
See application file for complete search history.

(56) References Cited

U.S. PATENT DOCUMENTS 1,305,535 A    6/1919   Grabowiecki
2,694,164 A *  11/1954  Geppelt .............. H01F 7/0252
                                                       335/296
(Continued)

FOREIGN PATENT DOCUMENTS

CN    202011305 U    10/2011
CN    202115264 U *   1/2012
(Continued)

OTHER PUBLICATIONS

Machine Translation of CN102689296 (Year: 2012).*
(Continued)

*Primary Examiner* — Jacob J Cigna
*Assistant Examiner* — Michael W Hotchkiss
(74) *Attorney, Agent, or Firm* — Leason Ellis LLP

(57) ABSTRACT

A method for traversing a magnetically inducible surface using a multidirectional wheel is provided. The method includes providing a vehicle having the multidirectional wheel, rotating a hub of the wheel along a first axial direction of rotation, continuing rotation of the hub of the wheel so as to cause a first roller disposed about a periphery of the hub to move out of contact with a first portion of the magnetically inducible surface and to cause a second roller disposed about the periphery of the hub in a plurality of rollers to contact a second portion of the magnetically inducible surface, wherein at least one roller among the plurality of rollers is in contact with the magnetically inducible surface throughout rotation of the wheel, and wherein the flux of the at least one magnet is concentrated toward portions of the surface being traversed adjacent to one or more of the plurality of rollers throughout rotation of the wheel.

10 Claims, 12 Drawing Sheets

Related U.S. Application Data continuation of application No. 14/552,010, filed on Nov. 24, 2014, now Pat. No. 9,579,927.

(60) Provisional application No. 61/910,320, filed on Nov. 30, 2013.

(56) References Cited

U.S. PATENT DOCUMENTS

| | | | |
|---|---|---|---|
| 3,295,700 A | | 1/1967 | Ziegler |
| 3,363,735 A | | 1/1968 | Hotchkiss |
| 3,465,843 A | | 9/1969 | Guinot |
| 3,590,970 A | | 7/1971 | Kornylak |
| 3,789,947 A | * | 2/1974 | Blumrich ............ B60B 19/003 180/6.48 |
| 3,872,940 A | | 3/1975 | Gambini |
| 3,882,885 A | | 5/1975 | McCain |
| 4,223,753 A | * | 9/1980 | Bradbury ................ B60B 9/00 180/21 |
| 4,237,990 A | | 12/1980 | La |
| 4,335,899 A | | 6/1982 | Hiscock |
| 4,722,001 A | | 1/1988 | Rohrich et al. |
| 4,823,900 A | | 4/1989 | Farnam |
| 4,981,203 A | | 1/1991 | Kornylak |
| 5,213,176 A | * | 5/1993 | Oroku .................. B60B 19/003 180/168 |
| 5,246,238 A | | 9/1993 | Brown |
| 5,323,867 A | | 6/1994 | Griffin et al. |
| 5,383,715 A | | 1/1995 | Homma et al. |
| 5,388,528 A | | 2/1995 | Pelrine et al. |
| 5,404,984 A | | 4/1995 | Hagman |
| 5,551,349 A | | 9/1996 | Bodzin |
| 6,125,955 A | * | 10/2000 | Zoretich ............. B60B 19/006 152/44 |
| 6,757,936 B2 | * | 7/2004 | Yamaguchi ......... B60B 19/003 16/31 R |
| 7,012,495 B2 | | 3/2006 | Underwood et al. |
| 7,182,025 B2 | | 2/2007 | Ghorbel et al. |
| 7,210,364 B2 | | 5/2007 | Ghorbel et al. |
| 7,233,221 B2 | * | 6/2007 | Reboredo Losada ... B60B 3/048 105/78 |
| 7,293,790 B2 | | 11/2007 | Byun et al. |
| 7,520,356 B2 | | 4/2009 | Sadegh et al. |
| 7,566,102 B2 | | 7/2009 | Guile |
| 7,730,978 B2 | | 6/2010 | Dixon |
| 7,949,437 B2 | | 5/2011 | Wong et al. |
| 7,980,335 B2 | | 7/2011 | Potter |
| 8,160,762 B2 | * | 4/2012 | Moriguchi ........... G05D 1/0227 701/22 |
| 8,269,447 B2 | | 9/2012 | Smoot et al. |
| 8,308,604 B2 | | 11/2012 | Wu et al. |
| 8,342,281 B2 | | 1/2013 | Rooney, III et al. |
| 8,360,177 B2 | | 1/2013 | Fischer |
| 8,879,639 B2 | | 11/2014 | Sauerwein, Jr. |
| 2002/0104693 A1 | * | 8/2002 | Moore ................. B62D 57/024 180/9.1 |
| 2008/0295595 A1 | | 12/2008 | Tacklind et al. |
| 2009/0078484 A1 | * | 3/2009 | Kocijan .................. B60L 13/04 180/167 |
| 2011/0083599 A1 | | 4/2011 | Kornstein et al. |
| 2011/0233989 A1 | | 9/2011 | Takenaka et al. |
| 2011/0272998 A1 | * | 11/2011 | Lee ........................ B60B 19/12 301/5.23 |
| 2012/0200380 A1 | | 8/2012 | Kocijan |
| 2013/0133960 A1 | | 5/2013 | Yada |
| 2013/0292918 A1 | * | 11/2013 | Schlee .................... B60B 19/12 280/79.11 |
| 2014/0152803 A1 | | 6/2014 | Carlson et al. |

FOREIGN PATENT DOCUMENTS

| | | | | | |
|---|---|---|---|---|---|
| CN | 102689296 A | * | 9/2012 | | |
| EP | 1886904 A2 | | 2/2008 | | |
| EP | 2197731 B1 | | 6/2010 | | |
| JP | 02120168 | | 5/1990 | | |
| JP | H09267604 A | | 10/1997 | | |
| JP | 2007022342 A | * | 2/2007 | | |
| JP | 2007022342 A | | 2/2007 | | |
| KR | 20100120324 A | * | 11/2010 | ........... | G05D 1/0227 |
| KR | 20100120324 A | | 11/2010 | | |
| KR | 20110105743 A | * | 9/2011 | | |
| WO | WO-2006133627 A1 | * | 12/2006 | ........... | B60B 19/006 |
| WO | 2014076806 A1 | | 5/2014 | | |

OTHER PUBLICATIONS

Machine Translation of JP2007022342 (Year: 2007).*
Machine Translation of KR20100120324A (Year: 2010).*
Machine Translation of KR20110105743A (Year: 2011).*
Machine Translation of WO2006133627A (Year: 2006).*
Machine Translation of CN102689296A (Year: 2012).*
Machine Translation of CN202115264U (Year: 2012).*
Machine Translation of JP2007022342A (Year: 2007).*
Choi et. al. "Robotic system with active steering capability for internal inspection of urban gas pipelines." Elsevier Science Ltd. Mechatronics 12 (2002) 713-736.
Fischer et al. "Magnetic Wall Climbing Robot for Thin Surfaces with Specific Obstacles." Author manuscript, published in 6th International Conference on Field and Service Robotics—FSR 2007, Chamonix: France Version 1—Dec. 6, 2007. pp. 1-10.
Hutter. "Realization of a new compact magnetic wheeled climbing robot." Swiss Federal Institute of Technology Zurich. Autonomous Systems Lab. Spring 2009. pp. 1-62.
Jin et al. "A Magnetic Wheel Structure for an Omnidirectional Microrobot to Limit Slip Effect." International Journal of Advanced Robotic Systems, vol. 6, No. 4 (2009) ISSN 1729-8806, pp. 277-284.
Lee et. al. "Recognition of Corrosion State Based on Omnidirectional Mobile Robot for Inspection of CAS for Oil Tanker." Annual Conference 2008. Aug. 20-22, 2008, The University Electro-Communications, Japan. pp. 155-159.
Li et al. "An In-pipe Inspection Robot based on Adaptive Mobile Mechanism: Mechanical Design and Basic Experiments." Proceedings of the 2007 IEEE/RSJ International Conference on Intelligent Robots and Systems San Diego, CA, USA, Oct. 29-Nov. 2, 2007. pp. 2576-2581.
Liu et al. "Symmetrically Centralized Magnetic-Wheel Unit for Wall-Climbing Robots." Presented Aug. 2007. pp. 247-251.
No Author. "Advanced Environmental Technologies." Robotics and Inspection Services. 2008. Web. Sep. 24, 2014. <http://www.aettopgun.com/pipe.html> 1 page.
No Author. "CamOnWheels." CamOnWheels RSS. Web. Sep. 23, 2014. <http://www.camonwheels.com/>. pp. 1-2.
No Author. "HR-MP5 Features." Light Weight Magnetic Climbing Robot. Web. 2010-2014.
No Author. "Pipe Handling Conveyors." Cisco-Eagle. Web. Sep. 23, 2014. <http://www.cisco-eagle.com/catalog/c-3278-pipe-handling-conveyor.aspx>. pp. 1-4.
No Author. "Pipe Wheels." DH Casters Wheels. Web. Sep. 23, 2014. <http://www.dhcasters.com/pipe-wheels-p-1032-l-en.html>. pp. 1-2.
No Author. "Solid Polymer Conveyor Rollers." Power-Core. Web. Sep. 23, 2014. <http://www.intechpower.com/products/solid-polymer-conveyor-rollers-/>. pp. 1-2.
No Author. "Stainless Steel V-Groove Wheel Casters W-313-SVB-1/2." Hamilton. Web. Sep. 23, 2014. <http://www.hamiltoncaster.com/Casters/Stainless_Steel_Casters/Stainles>. pp. 1-2.
No Author. "V Groove Caster Wheels." Caster City. Web. Sep. 23, 2014 <http://www.castercity.com/vgroovew.htm> 3 pages.
No Author. "Internal Inspection of Small Pipes; PIPETRON." HiBot Corporation. Grren Innovations Jetro Partnerships. 2005-2012.
No Author. "Service Droid—The Build. Let's Make Robots." Sep. 7, 2013. Web. Retrieved on Oct. 4, 2013. 7 pages. <http://letsmakerobots.com/node/38376?page=1>.
Rojas. "A short history of omnidirectional wheels." 2006. pp. 1-4.

(56) References Cited

OTHER PUBLICATIONS

Tâche et al. "Adapted Magnetic Wheel Unit for Compact Robots Inspecting Complex Shaped Pipe Structures." Advanced intelligent mechatronics, 2007 IEEE/ASME international conference. pp. 1-6.
Tâche et al. "Compact Magnetic Wheeled Robot With High Mobility for Inspecting Complex Shaped Pipe Structures." 2007. pp. 1-6.
Tâche. "Magnebike: A Magnetic Wheeled Robot With High Mobility for Inspecting Complex Shaped Structures." Article first published online: Mar. 6, 2009. pp. 1-33.
Tang et al. "An Omni-directional Wall-climbing Microrobot with Magnetic Wheels Directly Integrated with Electromagnetic Micromotors." Int J Adv Robotic Sy, 2012, vol. 9, 16:2012.
Tavakolia et al. "OmniClimbers: Omni-directional magnetic wheeled inspection of ferromagnetic structures." vol. 61, Issue 9, Sep. 2013, pp. 997-1.

\* cited by examiner

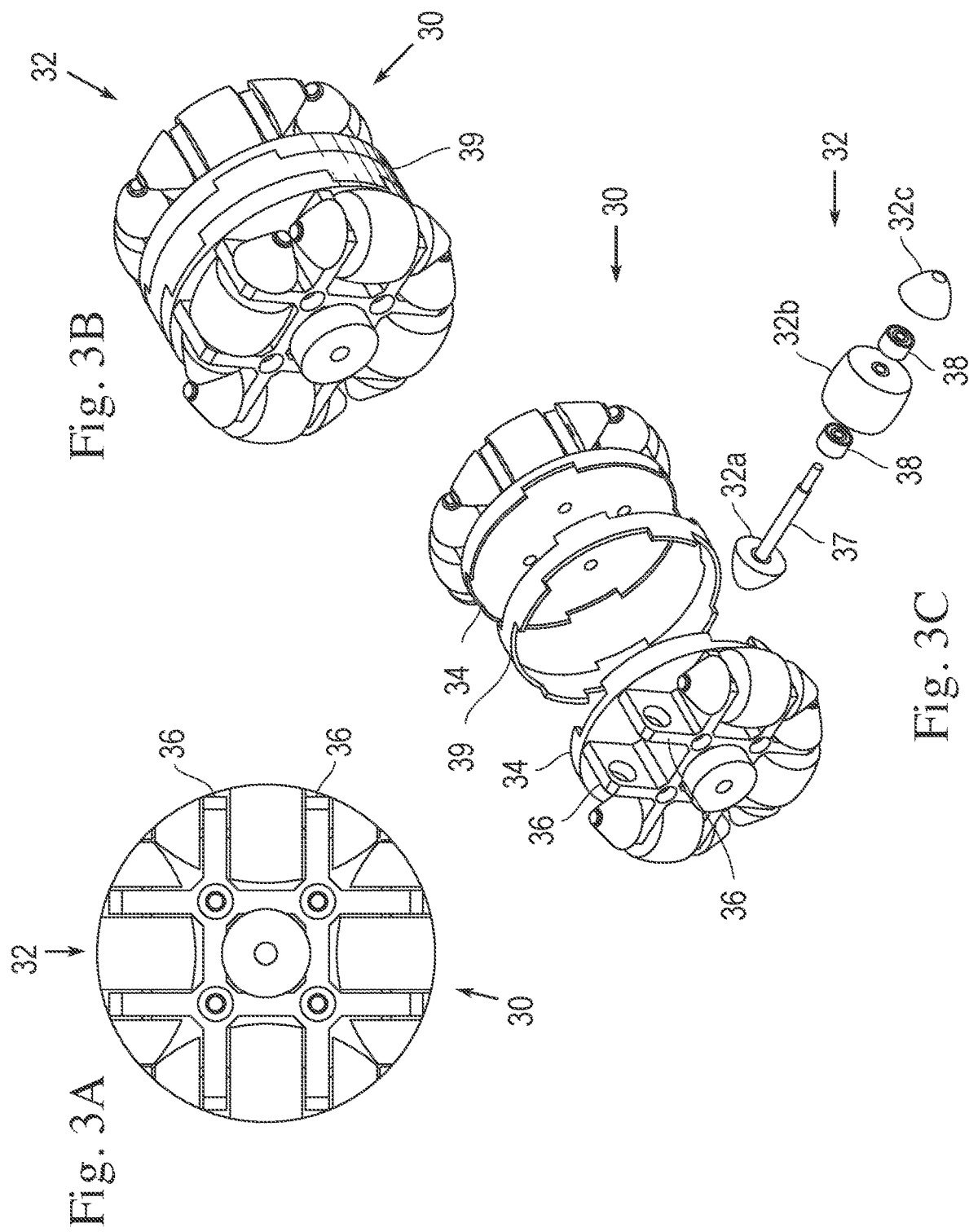

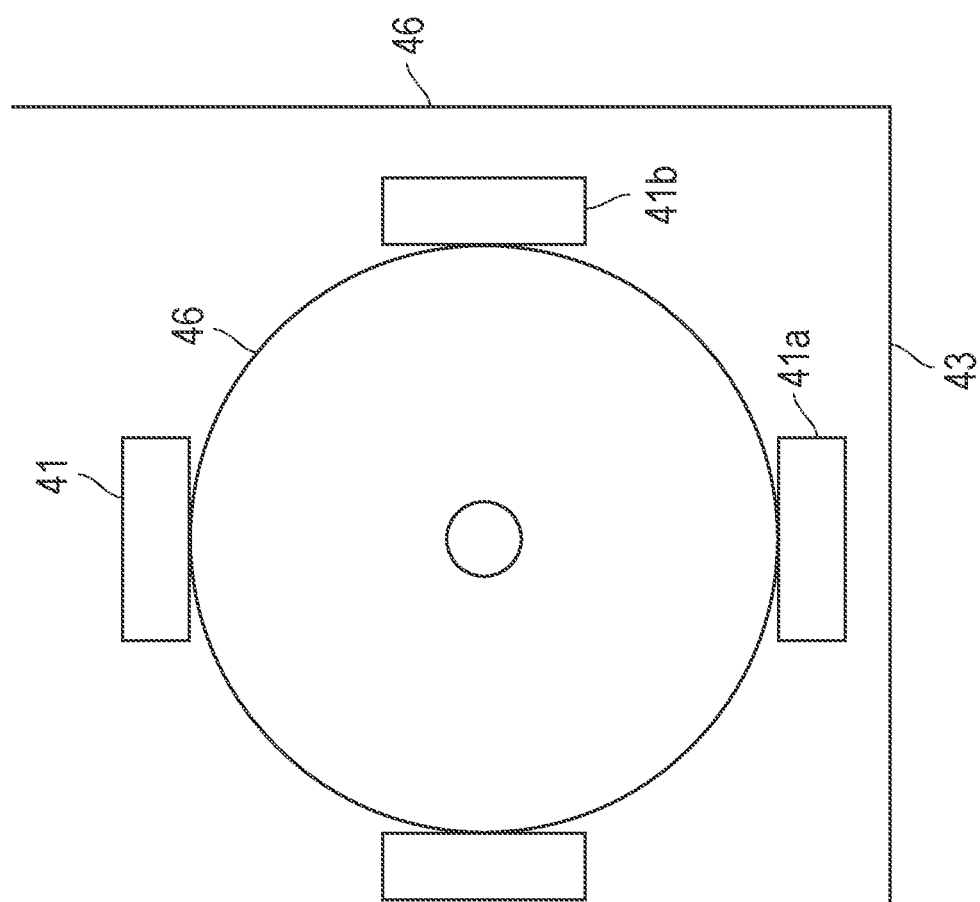

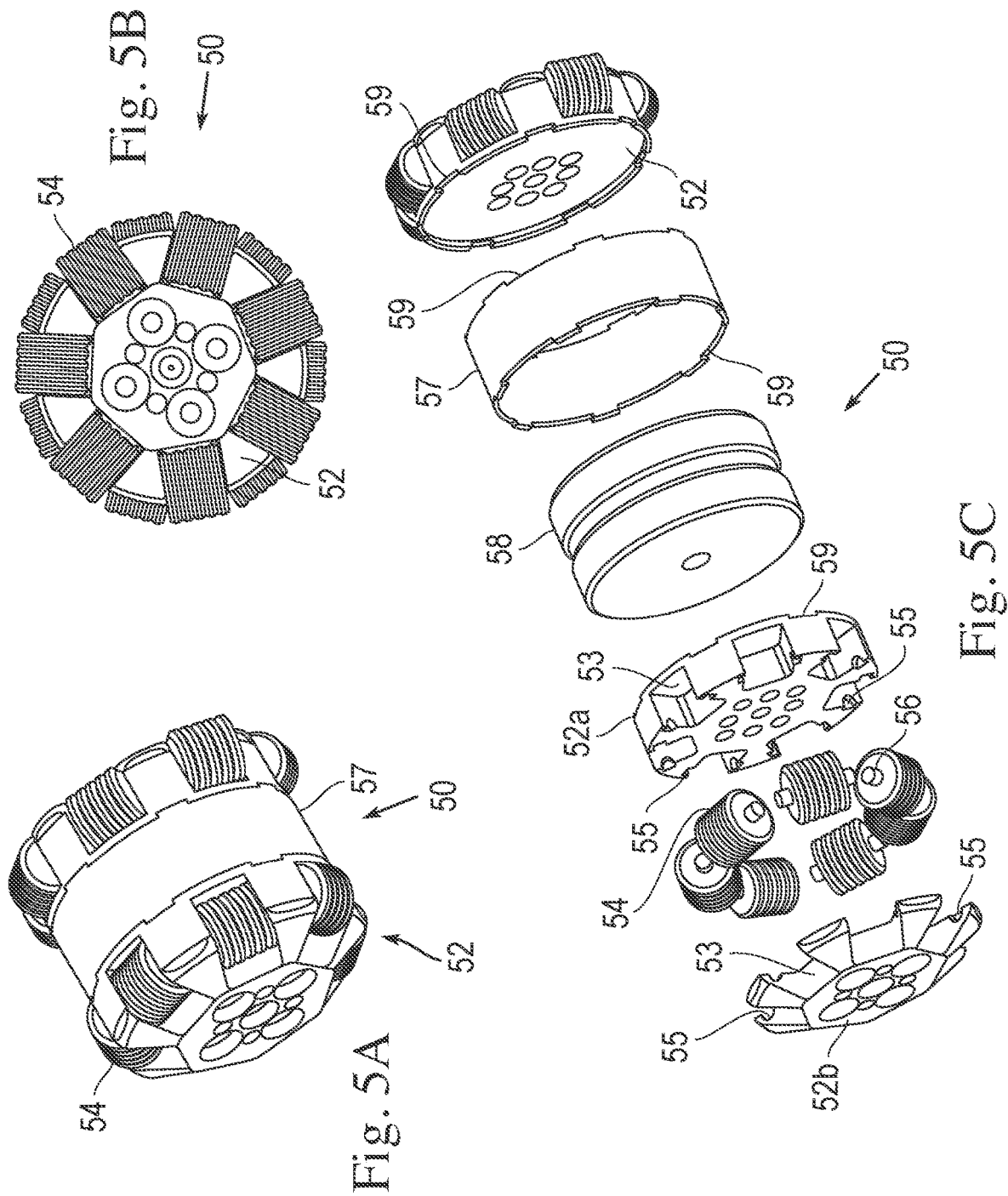

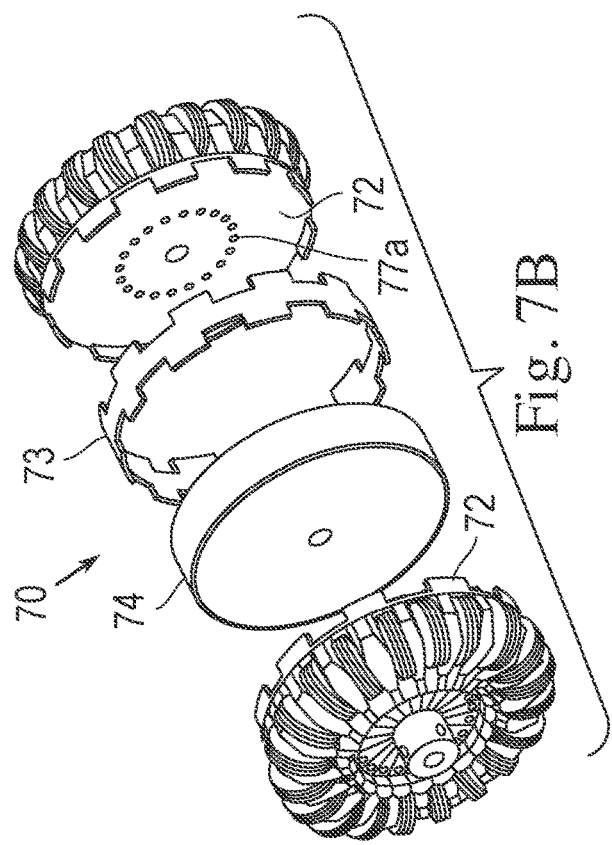
Fig. 7A
Fig. 7B
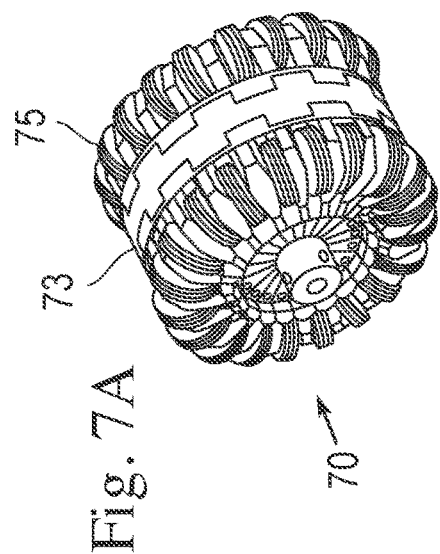
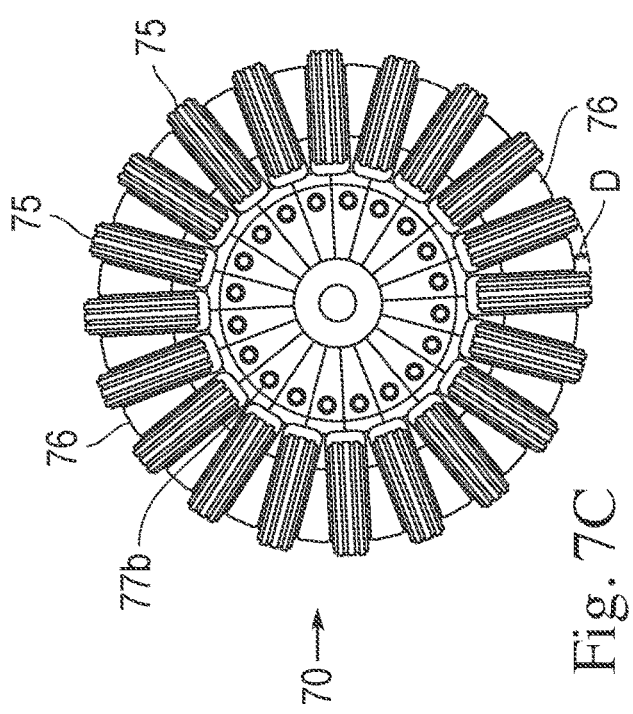
Fig. 7C
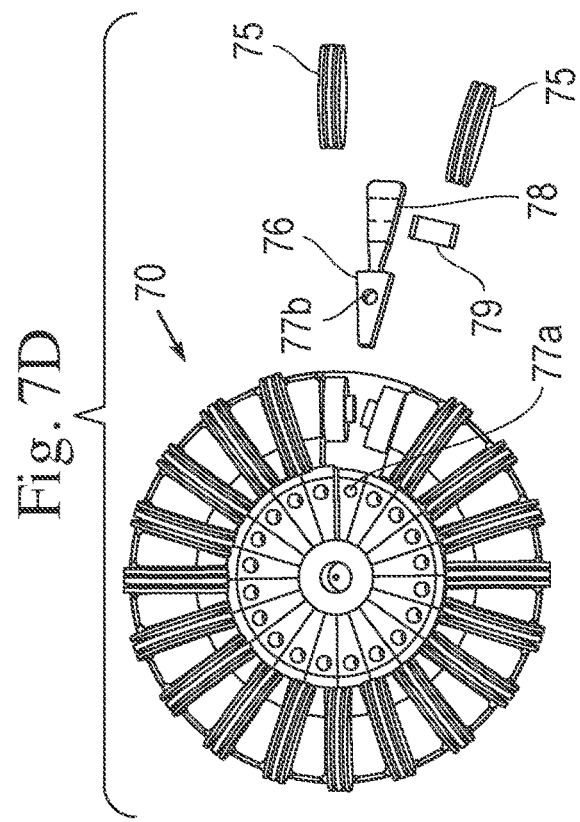
Fig. 7D

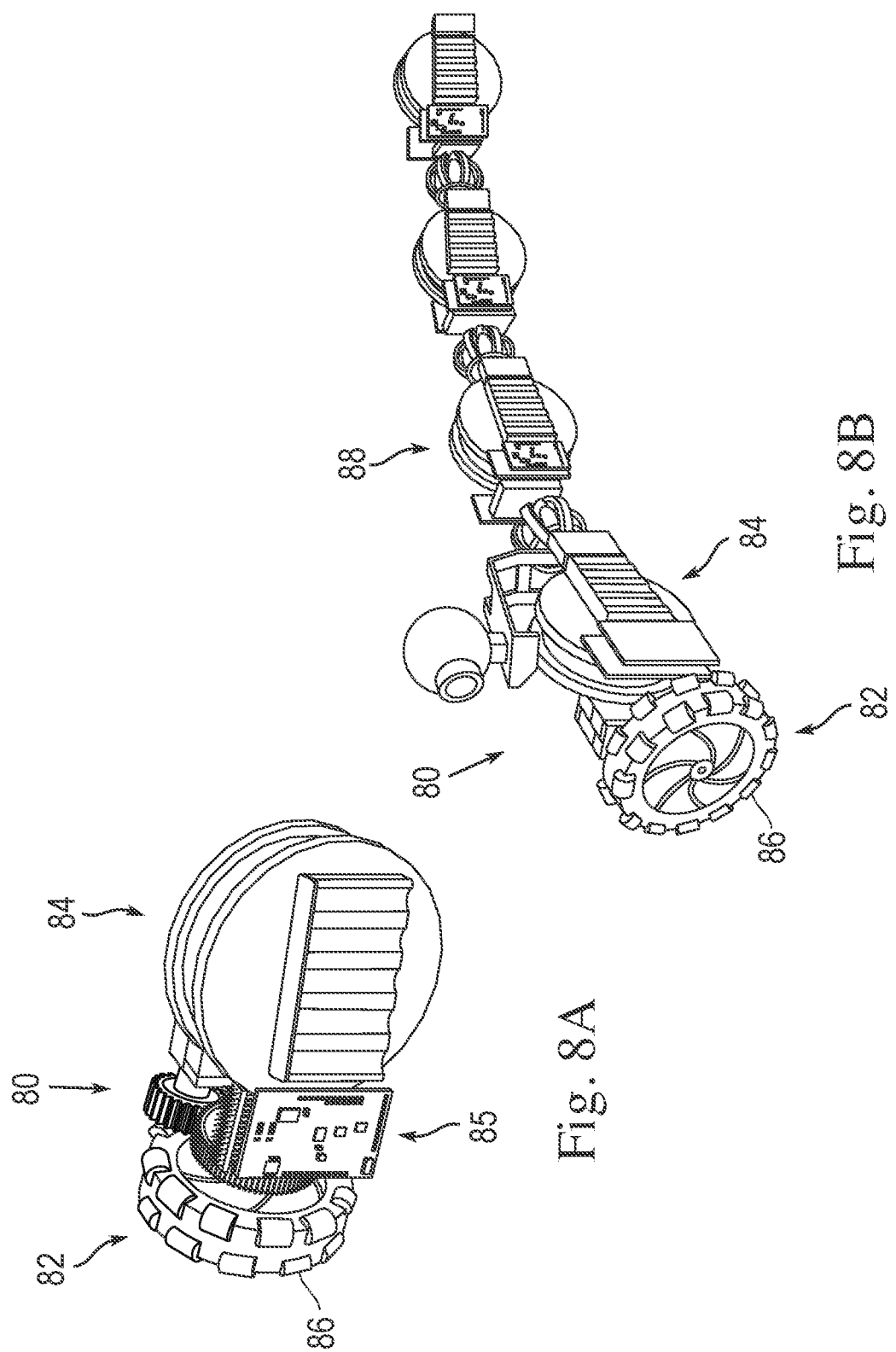

METHOD FOR TRAVERSING SURFACE WITH MAGNETIC OMNI-WHEEL

CROSS-REFERENCE TO RELATED APPLICATIONS

This application is a divisional of and claims the benefit of priority to, U.S. patent application Ser. No. 15/436,368, filed Feb. 17, 2017, entitled "Magnetic Omni-Wheel," which is a continuation of and claims the benefit of priority to, U.S. patent application Ser. No. 14/552,010, entitled "MAGNETIC OMNI-WHEEL" filed Nov. 24, 2014, now U.S. Pat. No. 9,579,927 issued Feb. 28, 2017 which is based on and claims priority to U.S. Provisional Patent Application Ser. No. 61/910,320, filed on Nov. 30, 2013, which are hereby incorporated by reference as if set forth in their respective entireties herein.

FIELD OF THE INVENTION

The present invention relates to magnetic wheels and omni-wheels.

BACKGROUND

Other wheels having differing designs are known in various documents, including, among others, U.S. Pat. No. 8,308,604 entitled "Omni-wheel based driving device with belt transmission mechanism;" U.S. Pat. Pub. No. 2008/0295595 entitled "Dynamically balanced in-line wheel vehicle;" U.S. Pat. No. 7,233,221 entitled "Magnetic wheel for vehicles;" U.S. Pat. Pub. No. 2012/0200380 entitled "Magnetic wheel;" and an article by Lee, Seung-heui, et. al. entitled "Recognition of Corrosion State Based on Omnidirectional Mobile Robot for Inspection of CAS for Oil Tanker Annual Conference 2008." The specific designs and features of the wheels and vehicles described in these documents can best be appreciated by a review of their respective disclosures.

SUMMARY

According to an aspect of the present invention, there is provided a multidirectional wheel for traversing a surface. The wheel includes at least one hub, the at least one hub defining a first axial direction of rotation. A plurality of rollers are disposed around an outer periphery of the at least one hub, the rollers being mounted for rotation in a second axial direction that is at an angle to the first axial direction. The wheel includes at least one magnet, the at least one magnet being mounted to the at least one hub. The hub is made of a magnetically inducible material that concentrates a flux of the at least one magnet toward the surface being traversed.

According to a further aspect, the at least one magnet is mounted for rotation with the hub.

According to yet a further aspect, a plurality of magnets are each connected to a respective spoke, wherein the spokes are mounted for free rotation with respect to an axle that is disposed along the first axial direction.

According to a still further aspect, the number, size, and spacing of the rollers is such that the wheel approximates a perfect circular rotation as it traverses the surface.

According to another further aspect, each roller includes three segmented pieces and wherein the segmented pieces are sized and shaped such that the wheel approximates a perfect circular rotation as it traverses the surface.

According to another further aspect, the at least one hub includes a first part and a second part that are removably connected and wherein the first and second parts define a recess for receiving the rollers.

According to another still further aspect, a plurality of wedge-shaped mounts for connecting the rollers to the at least one hub are provided.

According to a still further aspect, the at least one magnet is a high temperature magnet.

According to a further aspect, the at least one magnet is a permanent magnet.

According to a yet further aspect, the at least one magnet is an electromagnet.

According to a further aspect, the rollers are made of magnetic inducible material that improves flux concentration.

According to a further aspect, wherein the rollers are modified to increase friction.

According to a further aspect, wherein the magnet is covered by a non-magnetically inducible ring.

According to another aspect, a multidirectional wheel for traversing a surface that includes at least two magnetically inducible bodies mounted for rotation about a first axial direction along a first axis is provided. One or more magnets are concentrically disposed about the first axis, the magnets having poles and the magnets being oriented such that their poles are oriented along the first axial direction and facing in the same direction, the one or more magnets being mounted between the at least two magnetically inducible bodies. A plurality of rollers are disposed around an outer periphery of each of the magnetically inducible bodies, the rollers being mounted for rotation in a second axial direction that is at an angle to the first axial direction. The magnetically inducible bodies concentrate a flux of the one or more magnets toward the surface being traversed.

According to a further aspect, the one or more magnets are circular disk shaped.

According to a still further aspect, the one or more magnets are ring shaped.

According to another further aspect, the one or more magnets are concentrically arranged about the first axis and radially spaced therefrom.

According to a still further aspect, the one or more magnets mounted for rotation with respect to the at least two magnetically inducible bodies.

According to a further aspect, the at least two magnetically inducible bodies are sized and shaped and the rollers are disposed thereon such that the distance between the two magnetically inducible bodies and the traveling surface is minimized without crossing a contact circle between the roller and the traveling surface.

According to another further aspect, the at least two magnetically inducible bodies are removably connected and wherein the at least two magnetically inducible bodies define a recess for receiving the rollers.

According to yet a still further aspect, a plurality of wedge-shaped mounts for connecting the rollers to the at least two magnetically inducible bodies and wherein the wedge-shaped mounts are magnetically inducible are provided.

According to a further aspect, one or more concentrator members of magnetically inducible material that further concentrate the flux of the one or more magnets toward the surface being traversed are included.

According to further aspect, the one or more magnets are high temperature magnets.

According to a still further aspect, the one or more magnets are permanent magnets.

According to a further aspect, the rollers are made of magnetic inducible material that improves flux concentration.

According to a further aspect, wherein the rollers are modified to increase friction.

According to a further aspect, wherein the magnet is covered by a non-magnetically inducible ring.

According to a further aspect, wherein the two bodies have at least one threaded hole to be used to detach the magnet from the bodies during disassembly of the multidirectional wheel.

BRIEF DESCRIPTION OF THE DRAWING FIGURES

FIGS. 3A-3C illustrate a magnetic omni-wheel according to a fourth arrangement;

FIG. 4B illustrates a first magnet configuration of the omni-wheel of FIG. 4A;

FIGS. 5A-5C illustrate a magnetic omni-wheel according to a seventh arrangement;

FIGS. 7A-7D illustrate a magnetic omni-wheel according to a ninth arrangement

FIG. 8A illustrates a vehicle that includes a magnetic omni-wheel; and

FIG. 8B illustrates a second vehicle that includes a magnetic omni-wheel.

DETAILED DESCRIPTION OF CERTAIN EMBODIMENTS

Figure 1B:
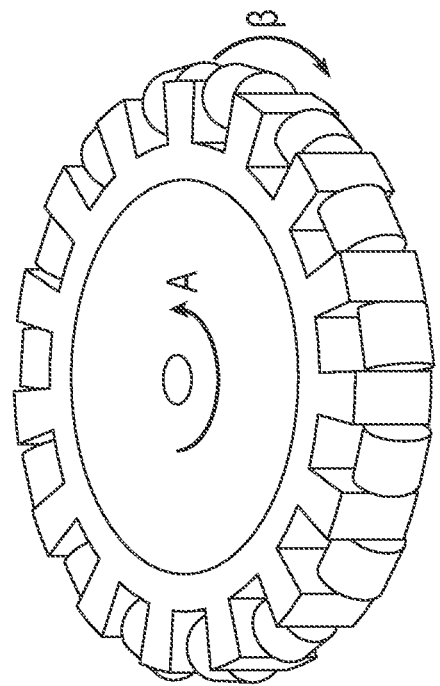
FIG. 1B illustrates an assembled view of the magnetic omni-wheel of FIG. 1A.
Figure 1A:
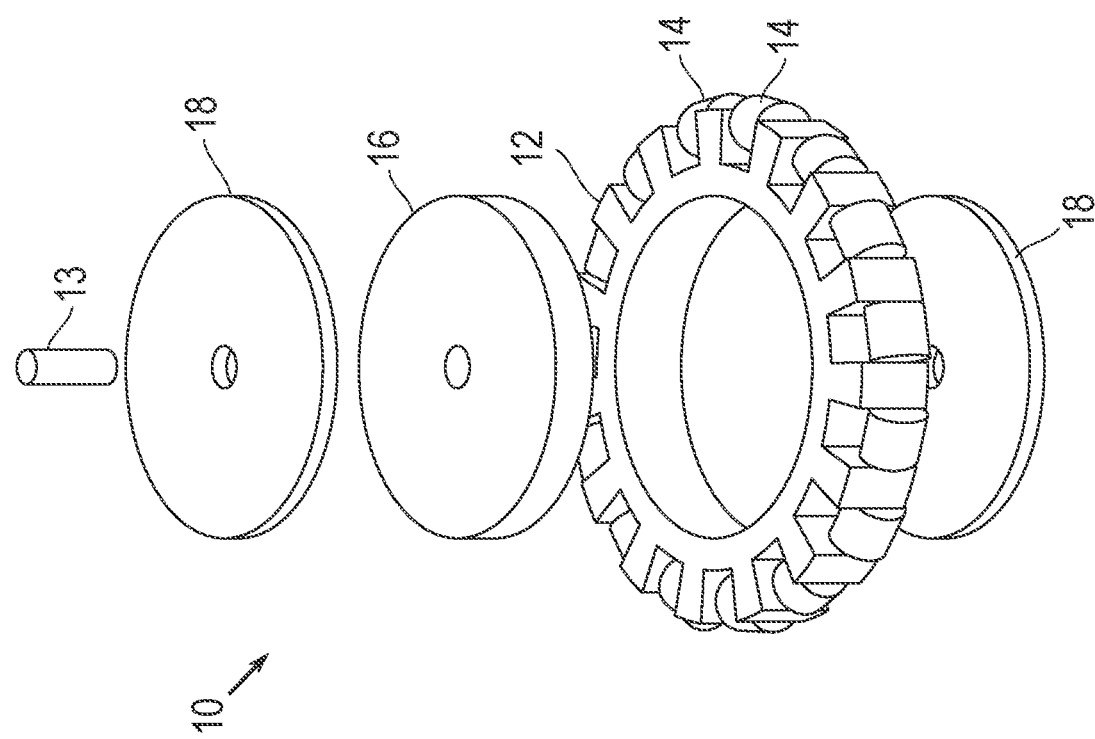
FIG. 1A illustrates a magnetic omni-wheel in an exploded view according to a first arrangement.

Referring to FIGS. 1A and 1B, a magnetic omni-wheel 10 is shown. The omni-wheel 10 includes a hub 12 and a plurality of rollers 14 arranged around the outer periphery of the hub 12. The rollers are arranged perpendicular to the direction of axial rotation of the hub 12. The hub 12 can include spokes or other structure (e.g. a circular web of material) that extend toward the center of the hub for mounting to an axle 13. The rollers 14 and the rollers discussed below can be mounted to the hub 12 via pins, protrusions, axles, or other suitable structure that permits the rollers to rotate. The rollers can be made of a material or have a surface texture (e.g., rubber, soft plastic, or surface textured steel, etc.) or be knurled or have a surface coating so that the rollers can provide a coefficient of friction that is sufficient for the wheel to provide traction so that it can drive/steer a vehicle in a vertical and/or upside-down orientation when the weight of the vehicle counteracts the normal force provided by the magnet 16, as discussed in more detail below. The rollers can also be made of a magnetically inducible material and incorporate friction enhancing treatments. Thus, the force required by the magnet can be reduced, which increases the efficiency when the vehicle travels in a right-side-up orientation.

The hub 12 permits rotation in the direction indicated by the arrow "A" about an axle 13 that defines a first axial direction. The rollers 14 permit rotation in the direction indicated by arrow "B" that is in a second axial direction perpendicular to the first axial direction. (Alternatively, Mecanun type wheels can be used instead, in which case the rollers are mounted at 45° relative to the hub). As such, the omni-wheel permits rotation with two degrees of freedom. This arrangement is particularly useful for vehicles that must operate in tight confines, such as robotic vehicles used to inspect pipes, tanks, and other metallic structures. A magnetic disk 16 is located within hub 12. The magnetic disk 16 can be mounted to the hub for free rotation with respect to the hub. The magnetic disk 16 provides a magnetic flux force and the material, size/number, and strength of the magnetic(s) are selected so as to hold the omni-wheel in contact with a ferrous surface material (e.g., a steel tank or pipe wall). In addition, ferrous disks 18 can be placed on the sides of the magnetic disk 16 in order to further direct the magnetic flux force from the magnetic disk 16 toward the ferrous surface, thereby increasing the attractive force between the disk and the surface. This arrangement results in a stronger holding force of the wheel. A non-magnetically inducible ring (e.g., non-magnetically inducible plastic ring) can be disposed around the magnet to protect the magnet from being exposed to the environment while avoiding flux leakage "short-circuiting" between the hub, disks, and/or traveling surface. It is also possible to use the ring to lock the rotation of the disk and/or hub forcing the magnet and disk/hub to rotate together.

The disks 18, which can be made from steel (or other magnetically polarizable/magnetically inducible material), enclose the inner section of the hub 12, thus coupling the magnetic flux on each side of the hub 12. Thus, the wheel 10 provides a pull force in the direction of a metallic surface on which the wheel is to move via the magnet 16 and disks 18, while simultaneously allowing two degrees of freedom of movement of the wheel along the surface via rotation of the hub 12 and the rollers 14.

The ferrous disk 18 can be attached to the hub 12 and can include an axial mounting hole 19 for attachment to the axle 13. The attachment between the disk 18 and the axle 13 can be fixed such that the axle 13 can be used to drive the omni-wheel 10, such as when the omni-wheel 10 is connected to a robotic vehicle, for example. Alternatively, the disk 18 can be connected to the axle 13 via a rotational connection so that the omni-wheel can spin freely with respect to axle 13, such as when the omni-wheel 10 is a passive follower-wheel of a robot vehicle that is driven by other means, for example. The magnetic disk 16 can also be fixedly attached or rotationally attached to the axle 13 so that it can either rotate with the axle or rotate freely with respect to the axle, respectively. Moreover, in addition to or as an alternative to the magnetic disk 16, a magnetic ring or an array of a plurality of magnets can be located within the hub 12. The magnet(s) (e.g., disk, ring, array, etc.) is (are) aligned such that its (their) polarization is consistent in regard to the opposing faces of the wheel 10 as being magnetically opposite. Thus, for instance, the magnets can all be aligned so that all the magnets present a south pole to one face of the wheel and a north pole to the other face of the wheel. The magnets can be concentrically arranged about an axis of the wheel and radially spaced from the axis. The magnets can be high temperature magnets (e.g., magnets that can withstand high temperatures without unacceptable degradation of the magnetic field strength). The magnets can also be permanent magnets, electromagnets, or a combination thereof.

The size, strength, and number of magnets can be varied in order to control the attractive force between the wheel and the surface by interchanging the magnetic disk, ring, or array for one or the other, and/or replacing the magnetic disk, ring, or array with the same structural arrangement with the disk/ring/array having a high magnetic flux, a low magnetic flux, or a desired amount appropriate for the intended operating conditions (e.g., by varying size and or materials of the magnet). The hub can include structure that provides cavities for mounting any one or all of these magnetic shapes, i.e., disk, ring, or array, either alone or in combination so that the magnetic flux strength and field shape can be customized for the intended application. This provides for scalability and flexibility in providing a specifically selected magnetic flux for the desired application. Accordingly, the magnetic force can be increased in certain instances in which the wheel(s) is connected to a relatively heavy robotic inspection vehicle, for example. The size of the wheel, its hub, rollers, and magnets, can be scaled based on a variety of applications, from very small robotic vehicles to large passenger vehicles. Moreover, a magnetic disk, ring, or array of magnets located in the hub offers significant advantages over designs in which the rollers are themselves magnetic. The present design reduces magnetic interference and changing fields, which lessens the attractive force to the surface and potentially damages or interferes with electronic equipment. In addition, the present design enables the use of two sets of rollers around the periphery of the hub 12.

This arrangement is particularly useful in applications that require traversing three-dimensional structures that are made from ferrous materials, such as pipes and tanks, etc. The magnetic omni-wheel permits travel on vertical surfaces as well as upside-down travel since the magnet provides sufficient attractive force to maintain contact between the wheel and the surface in these orientations. The magnetic omni-wheel can also be used in other forms of transport, such as part of a roller system for the movement of goods in a warehouse of factory, for example.

Figure 1D:
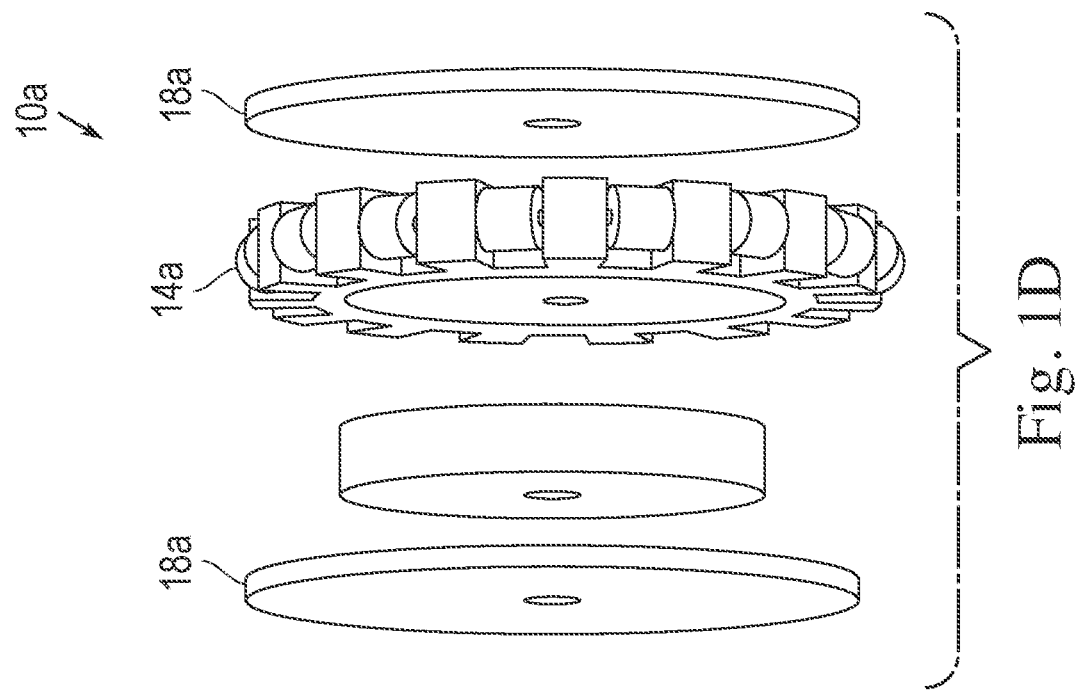
FIG. 1D illustrates an exploded view of the magnetic omni-wheel of FIG. 1C.
Figure 1C:
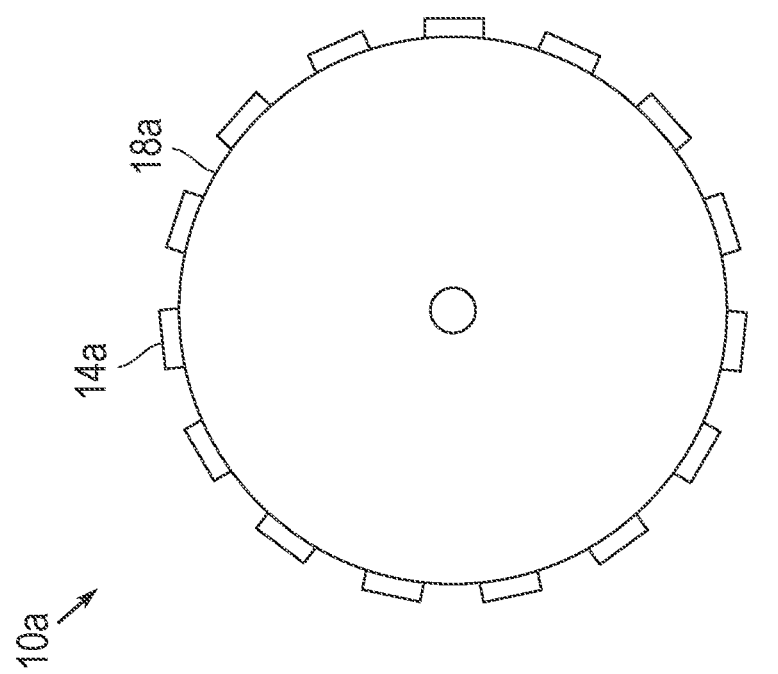
FIG. 1C illustrates a magnetic omni-wheel in an assembled view according to a second arrangement.

Referring to FIGS. 1C and 1D, an omni-wheel 10a is shown that is similar to the omni-wheel 10 shown in FIGS. 1A and 1B except that the ferrous disks 18a are larger in diameter. As can best be seen in FIG. 1C, the ferrous disks 18a are sized such that their diameter is just smaller than the circumferential diameter of the rollers 14a arranged around the hub of the wheel. Accordingly, the ferrous disks 18a are closer to the surface over which the wheel traverses. This structural arrangement improves the direction of the magnetic flux toward the surface to increase the attractive force between the wheel and the surface. Except as otherwise specifically noted, many of the characteristics and features of the embodiment described above can be applied to the embodiments below.

Figure 2:
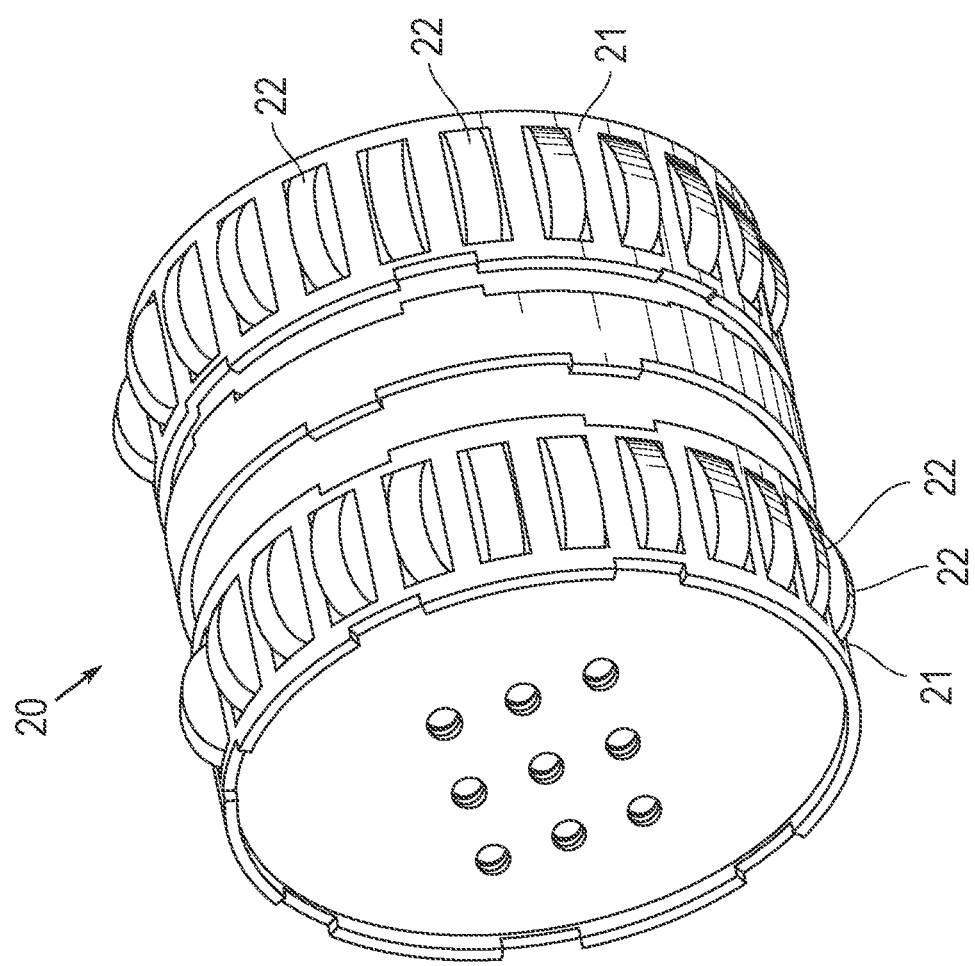
FIG. 2 illustrates a magnetic omni-wheel according to a third arrangement.

Referring to FIG. 2, an omni-wheel 20 that includes two sets of hubs and rollers 21, 22 are mounted together into a common unit. As can be seen in this embodiment, the number, size, shape, and spacing of the rollers 22 can be varied in relation to the diameter of the hub 21 so that the omni-wheel has a near-perfect circle profile. Such a configuration results in the wheel approximating a functionally perfectly circular rotation profile that eliminates bumps, oscillations, stall points, and drive force variations due to the shape of the wheel. Accordingly, as the hub rotates and one roller moves out of contact with the traveling surface the next roller successively is brought into contact with the surface. Thus, the surface contact points of the individual rollers together form a circle. This arrangement eliminates "bumps" in the travel of the wheel that otherwise can be caused by the wheel falling into "gaps" between successive rollers if they were spaced too far apart, for example. As one, non-limiting example, as the diameter of the hub increases the number of rollers disposed around the hub is increased so that the rollers maintain smooth contact with the surface as the hub rotates. Moreover, the near-perfect circle of contact means that there is a linear relationship between the degree of rotation of the wheel and the distance travelled, thus improving position control and accuracy.

As shown in FIGS. 3A, 3B, and 3C, an omni-wheel 30 with rollers 32 that have an elliptical, three-part segmented shape that also forms a near-perfect circle around the hub, and which also eliminates bumps in the travel of the wheel. The wheel 30 can include two hubs 34 on each side of the wheel. Each hub 34 includes mounting brackets 36 for mounting the rollers 32. The rollers consist of three segments 32a, 32b, and 32c that are shaped to form part of the elliptical shape. The rollers are mounted via a pin 37 and bearings 38 that are supported by mounting holes in the brackets. A spacer ring 39 can be placed between the two hubs 34 which defines a cavity between the two hubs. A magnet can be placed in the cavity between the two hubs.

The "near-perfect circle" design of wheel 30 eliminates bumps that can cause oscillation of the axle, which in turn can cause oscillation of a vehicle that is attached to the axle. Such oscillation could interfere with operation of that vehicle and/or disrupt any sensors or instruments mounted on that vehicle, such as an inspection robot, for example, and are minimized by the structure of the embodiments herein. In addition, the near-perfect circle design eliminates stall points that could otherwise occur as an imperfect wheel can fall into the valleys between successive rollers. Once one such imperfect wheel fell into one of those valleys it would take additional torque force to rotate the wheel out of that valley and on to the next roller. In addition, if the imperfect wheel were stopped, there would be a tendency for the wheel to continue to rotate until it was resting in one of the valleys between the rollers. This would interfere with operation of the vehicle and make it difficult to stop the vehicle at a precise location because of the natural tendency of the wheel to rotate to the next valley. Moreover, the near-perfect circle configuration, by contrast, helps maintain a continuous flux so as to minimize if not eliminate these and other problems.

Referring to FIGS. 4A-4G an omni-wheel 40 includes an array of magnets 41 are located between two hubs 42, each having rollers 44. The magnets 41 can be mounted to a mounting assembly 46. The mounting assembly 46 can include structure (e.g., spokes, circular web, etc.) that extends toward the center of the assembly 46 so that the assembly can be mounted to the axle A with the assembly 46 and the magnets 41 thereon able to rotate freely with respect to the axle and with respect to the hubs and rollers 42, 44.

Figure 4A:
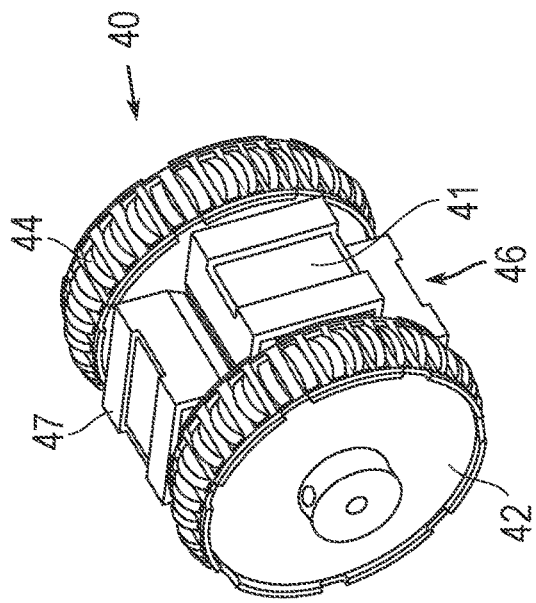
FIG. 4A is a front view of a magnetic omni-wheel according to a fifth arrangement.
Figure 4D:
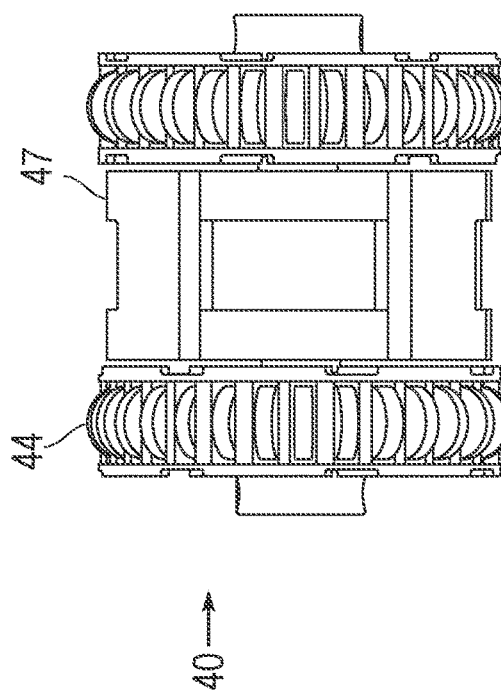
FIG. 4D is an isometric view of the magnetic omni-wheel of FIG. 4A.
Figure 4E:
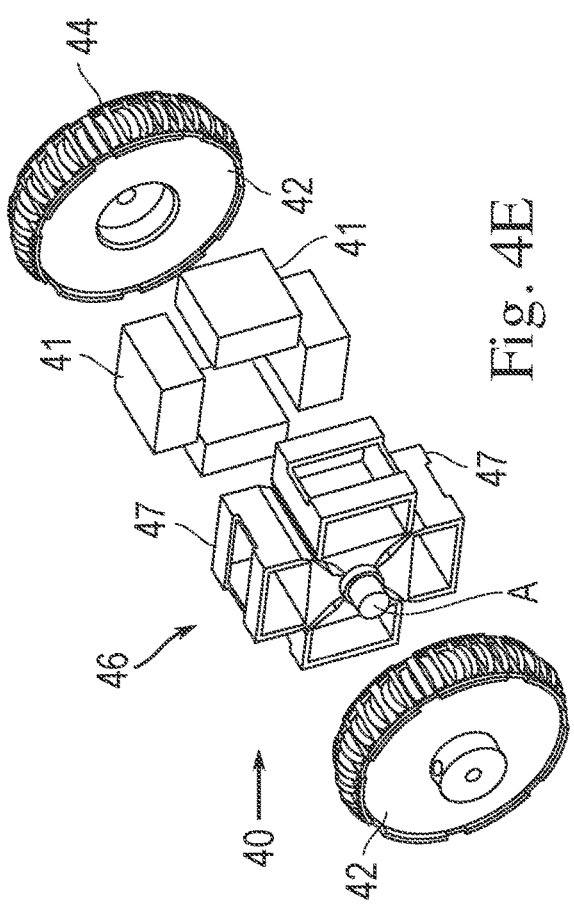
FIG. 4E is an exploded view of the magnetic omni-wheel of FIG. 4A.
Figure 4C:
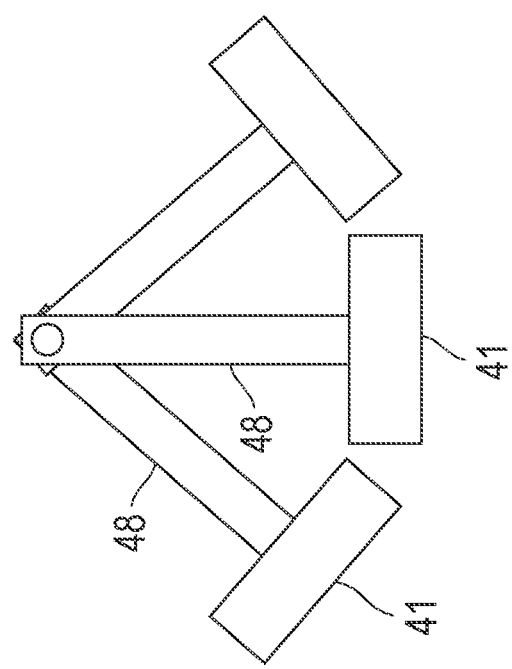
FIG. 4C illustrates a second magnet configuration of the omni-wheel of FIG. 4A.
Figure 4G:
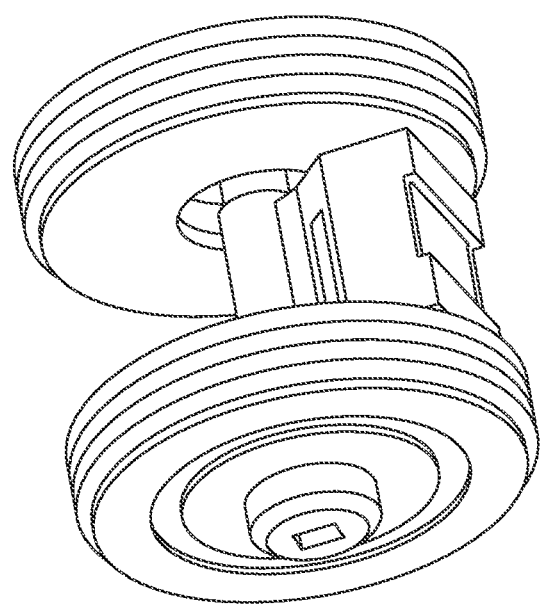
FIG. 4G is an assembled view of the magnetic wheel of FIG. 4F.
Figure 4F:
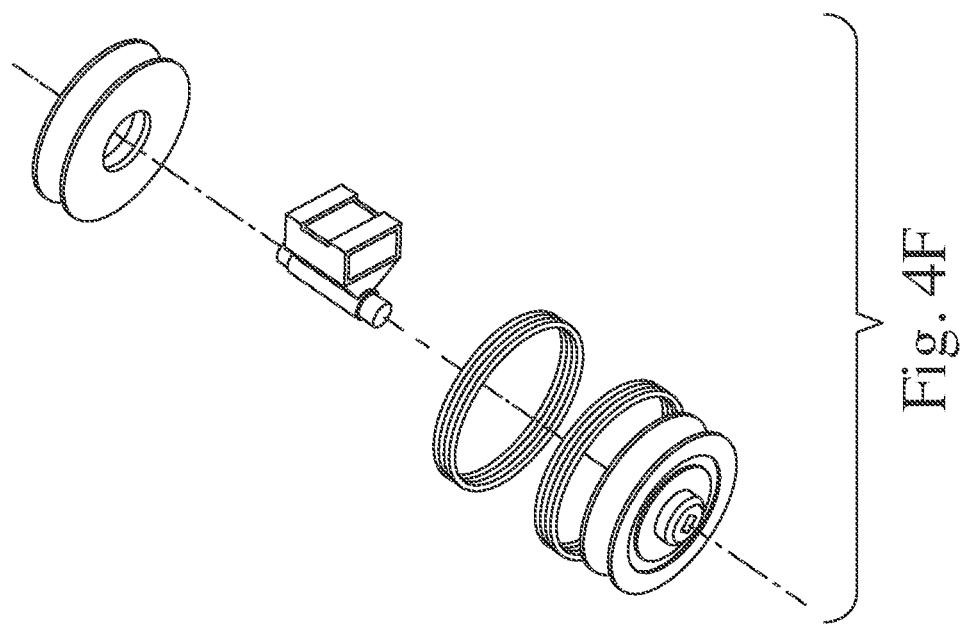
FIG. 4F is an exploded view of a magnetic wheel according to a sixth arrangement.

As shown in FIG. 4C, the mounting assembly 46 includes carriages 47. A magnet 41 is inserted into each respective carriage 47 and supported thereby. The top portion of each carriage 47 includes connecting portions that angle toward a collar that is disposed around axle A. The angle of the connecting portions can be selected based on the number of magnets to be supported such that the carriages are equally spaced around the circular axle. Alternatively, the two hubs 42 can be part of a unitary structure with a cylindrical extension connecting the two hubs, in which case the assembly 46 can be sized and shaped to rotate freely about the cylindrical extension. As can be seen in FIGS. 4F and 4G, carriage mounted magnets can also be used with wheels that do not include rollers.

The magnets 41 are arranged around the assembly 46 and oriented at different angles with respect to each other. The angles of orientation can include 20°, 30°, 45°, 60°, 90°, 120°, or other suitable angles, for example. FIG. 4B illustrates the magnets mounted on mounting assembly 46 (shown here as a mounting disk) and oriented at 90° with respect to each other. As such, as the wheel traverses a surface and encounters a junction between surfaces, such as the junction between a floor 43 and a wall 45 of a metal tank, for example, one of the magnets 41a can be oriented toward the floor surface at a first angle and another of the magnets 41b, which is mounted at a different angle, can be oriented toward the wall surface 45. Thus, two different magnets can simultaneously provide attractive holding force between two different surfaces. Such a structural arrangement enhances the ability of the omni-wheel to transition between traveling along a first surface to a second surface (e.g., floor to wall) since attractive force between the two surfaces is always maintained. In addition, as the wheel transitions to next surface the magnet 41 that provided the attractive force to the new surface maintains its magnetic purchase with that surface and rotates freely with respect to the omni-wheels. Thus, as the wall becomes the new "floor," the magnet in the array that is engaged with the wall rotates from having a frontward orientation to having a downward orientation and the magnetic that had a downward orientation now has a rearward orientation. This freely rotating arrangement reduces the chance of the omni-wheel decoupling with the surface since there is no need for one magnetic to "take over" providing the attractive force as the wheel transitions between surfaces. The same magnet that provided the attractive force at the start of the transitioning between surfaces maintains that force after the transition is completed. Alternatively, as shown in FIG. 4C, the magnets 41 can be mounted on independent, offset spokes 48 such that not only do the magnets rotate freely with respect to the axle and omni-wheels, but they also rotate freely with respect to each other. In this arrangement, the magnets 40 can rotate to be oriented into a position that has maximum magnetic attraction between the surfaces at a junction. For example, if the surfaces at the junction were oriented at an odd angle, say 85° with respect to each other, one of the freely rotating magnets can remain oriented toward the first surface while another magnet can freely rotate to orient toward the other surface at the 85° angle. Preferably, the diameter of the mounting assembly 46 and spokes 48 is selected such that the surface of the magnets do not extend past the rollers. In this way, the magnets can be maintained close enough to the surface to provide magnetic engagement without contacting the surface and creating friction.

Referring to FIGS. 5A-5C, an omni-wheel 50 with two-part hubs 52 is shown. Each hub 52 includes two halves consisting of a base 52a and a cover 52b. The base 52a and the cover 52b each include a plurality or recesses 53 to receive rollers 54. The base 52a and cover 52b include holes 55 that are sized and shaped to receive the roller axle 56 when the cover 52b is connected to the base 52a. This configuration permits easy assembly of the hub 52. With the cover 52 detached from the base 52a, the rollers 54 can be placed in their respective recesses 53. With the rollers in place, the cover 52b can be attached to the base 52a, for example, via fasteners (e.g., screws or bolts). Once each hub 52 is assembled, the two hubs 52 can be connected together with a spacer ring 57 disposed between the two hubs. The spacer ring 57 defines a cavity into which magnet 58 can be inserted. The size of the spacer ring 57 can be varied to accommodate larger or smaller magnets, thereby permitting adjustment of the magnetic force based on the particular application. In addition, the hubs 52 and the spacer ring 57 can include corresponding indexing notches 59. The indexing notches 59 ensure that each hub 52 is attached in the proper circular orientation with respect to the other hub. As can be seen in FIG. 5C, the hubs 52 are attached in a phase-shifted orientation such that the rollers 54 of one hub are aligned with the gaps between the rollers of the other hub. Phase-shifting the rollers helps reduces the bumps as the wheel rotates on a surface.

Figure 6A:
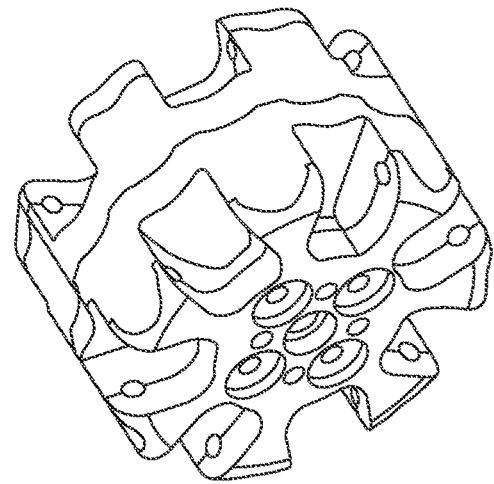
FIGS. 6A and 6B illustrate a magnetic omni-wheel according to an eight arrangement.
Figure 6B:
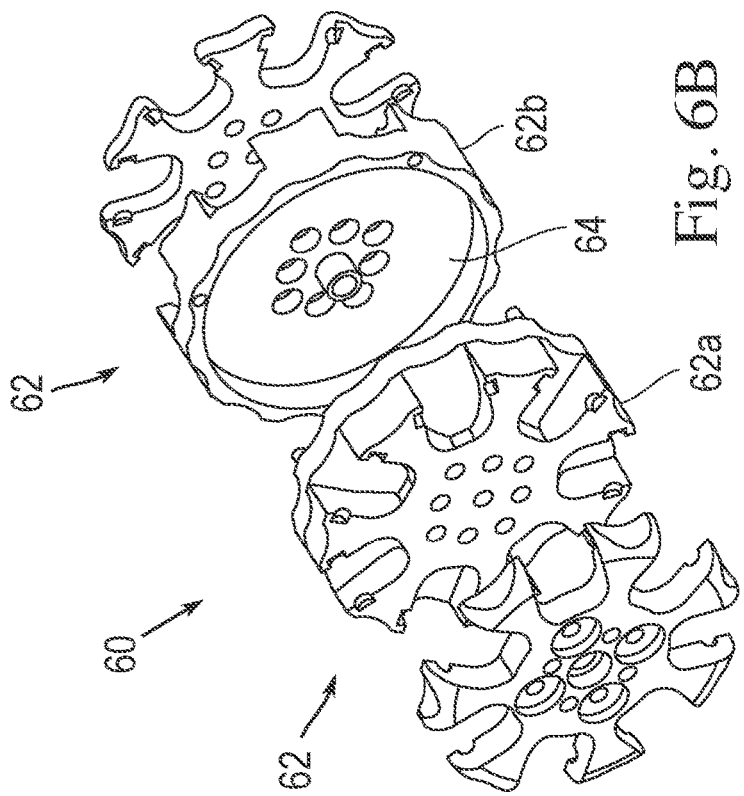

Referring to FIGS. 6A and 6B, an omni-wheel 60 with two-part hubs 62 is shown. The omni-wheel 60 is similar to omni-wheel 50 in that they both include hubs that have a base and a cover for mounting rollers. With respect to omni-wheel 60, the base 62a of each hub includes a recess 64. Each recess defines a cavity into which a magnet can be inserted. Accordingly, a spacer ring is not required since the recesses receive the magnet. The hubs can have at least one threaded hole to be used to detach the magnet from the bodies during disassembly of the multidirectional wheel.

Referring to FIGS. 7A-7D, an omni-wheel 70 that includes mounting wedges 76 is shown. The omni-wheel 70 includes two hubs 72, a spacer ring 73 disposed between the two hubs, wherein the spacer ring 73 defines a cavity for receiving magnet 74. Each hub 72 includes a plurality of rollers 75 that are attached to the hub via mounting wedges 76. The hub 72 includes a plurality of mounting holes 77a that correspond to a mounting hole 77b on each wedge 76 so that the wedges can be connected to the hub (e.g., via a fastener such as a screw, bolt, rivet, pin, etc.). Each wedge includes an axle mounting hole 78 that is sized and shaped to receive axle 79. As cab be seen, rollers 75 are mounted on axle 79 which is supported in the axle mounting hole 78 of wedge 76. The wedge 76 is attached to the hub 72 via mounting holes 77a and 77b. In this arrangement, the wheel can be readily assembled and dissembled. In addition, the wedges 76 can be made of magnetically inducible material (e.g., ferrous material) that acts as a flux concentrator. The size and shape of the wedges can be varied such that the distance D between edge of the wedge and the surface is reduced which results in an increase of the magnetic attractive force between the wheel and the surface. The distance D can be minimized up to the boundary defined by the rollers as the rollers rotate into contact with the surface. This contact boundary is circular in nature and, as described above, is defined by the surface contact points of the individual rollers together. It is desirable to size and shape the hubs or the parts thereof (e.g., the wedges) so that the hubs extend up to the circular boundary without crossing it. Crossing the circular boundary can create a frictioned contact between the hub and surface and interfere with the rolling of the rollers.

Referring to FIG. 8A, a drive system 80 for a robotic vehicle is shown. The drive system 80 includes a magnetic omni-wheel 82 and a driving wheel 84. The magnetic omni-wheel 82 is attached to the chassis of drive system 80 and is oriented along a first axial direction. The driving wheel 84 is attached to the chassis 85 of drive system 80 and is oriented along a second axial direction that is perpendicular to the first. The drive wheel 84 can be driven (e.g., via a motor and gear assembly) to provide forward and reverse locomotion of the drive system 80. Although the omni-wheel 82 is perpendicular to the drive wheel 84, the rollers 86 on the omni-wheel are aligned with the drive wheel 84 and, therefore, the drive system 80 can traverse a surface with relatively little friction introduced by the omni-wheel itself. The omni-wheel can also be driven (e.g., via a motor and gear assembly) so as to cause the omni-wheel to rotate which causes the drive system 80 to pivot since the omni-wheel 82 is mounted perpendicular to the drive wheel 84. As such, a vehicle can be driven and steered in a simple manner by controlling the rotation of the drive wheel 84 and the omni-wheel 82, respectively. The omni-wheel 82 can be any one of the omni-wheel configurations described herein. FIG. 8B illustrates a chained device in which a drive system 80 that includes both an omni-wheel 82 and drive wheel 84 is linked with additional drive systems 88 that only include drive wheels. Thus, the driving power and traction of a vehicle can be increased while maintaining a simple design.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for traversing a magnetically inducible surface using a multidirectional wheel, the method comprising:
   providing a vehicle having the multidirectional wheel, wherein the wheel comprises:
   a hub having hollow section;
   at least one magnet within the hollow section of the hub;
   the hub having a first axial direction of rotation and being made of a magnetically inducible material which is sized, shaped, and positioned to concentrate a flux of the at least one magnet through the hub and toward the magnetically inducible surface being traversed and thereby increase the attractive force between the wheel and the surface; and
   a plurality of rollers disposed around an outer periphery of the hub, the rollers being mounted for rotation in a second axial direction that is at an angle to the first axial direction, at least a first roller in the plurality of rollers contacting a first portion of the magnetically inducible surface while a second roller in the plurality of rollers does not contact the magnetically inducible surface;
   rotating the hub of the wheel along the first axial direction of rotation; and
   continuing rotation of the hub of the wheel so as to cause the first roller disposed about the periphery of the hub to move out of contact with the first portion of the magnetically inducible surface and to cause the second roller disposed about the periphery of the hub in the plurality of rollers to contact a second portion of the magnetically inducible surface,
   wherein at least one roller among the plurality of rollers is in contact with the magnetically inducible surface throughout rotation of the wheel, and
   wherein the flux of the at least one magnet is concentrated toward portions of the surface being traversed adjacent to one or more of the plurality of rollers throughout rotation of the wheel.

2. The method as in claim 1, wherein the vehicle further comprises a drive system, wherein the step of rotating the hub of the wheel uses the drive system.

3. The method as in clam 1, further comprising protecting the magnet from the environment.

4. The method as in claim 1, further comprising:
   continuing rotation of the hub of the wheel so as to cause the second roller disposed about the periphery of the hub to move out of contact with the second portion of the magnetically inducible surface and to cause a third roller disposed about the periphery of the hub in the plurality of rollers to contact a third portion of the magnetically inducible surface,
   wherein the third portion of the magnetically inducible surface is at an angle from the second portion of the magnetically inducible surface.

5. The method as in claim 4, wherein the angle between the second portion and third portion of the magnetically inducible surface is orthogonal.

6. The method as in claim 1, further comprising:
   attaching at least one ferrous disk to the hub, wherein the ferrous disk includes an axial mounting hole;
   connecting an axle to the axial mounting hole; and
   driving the multidirectional wheel with the axle.

7. The method as in claim 6, wherein the connecting step comprises a rotational connection between the axle and the at least one ferrous disk.

8. The method as in claim 1, further comprising arranging at least one ferrous disk on the magnet mounted within the hub.

9. The method as in claim 8, further comprising directing the magnet flux force away from the magnet and toward the ferrous disk.

10. The method as in claim 8, further comprising:
    disposing a non-magnetically inducible ring around the magnet, and
    locking the rotation of the ferrous disk or hub.

* * * * *